United States Patent
Hetrick et al.

(10) Patent No.: US 12,051,077 B1
(45) Date of Patent: *Jul. 30, 2024

(54) ARTIFICIAL INTELLIGENCE PAYMENT TIMING MODELS

(71) Applicant: Wells Fargo Bank, N.A., San Francisco, CA (US)

(72) Inventors: Shawn Anthony Hetrick, Des Moines, IA (US); Heather Charlotte Pemble, Johnston, IA (US); Brian J. Hein, Johnston, IA (US); John Ellsworth Quinnell, West Des Moines, IA (US); Andrew M. Waddill, Ankeny, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,248

(22) Filed: Nov. 30, 2022

Related U.S. Application Data

(63) Continuation of application No. 16/948,993, filed on Oct. 8, 2020, now Pat. No. 11,521,214.

(51) Int. Cl.
*G06Q 40/00* (2023.01)
*G06N 20/00* (2019.01)
(Continued)

(52) U.S. Cl.
CPC ........... *G06Q 30/016* (2013.01); *G06N 20/00* (2019.01); *G06Q 10/107* (2013.01); *G06Q 40/03* (2023.01);
(Continued)

(58) Field of Classification Search
None
See application file for complete search history.

(56) References Cited

U.S. PATENT DOCUMENTS

| | | | | |
|---|---|---|---|---|
| 7,313,543 | B1 * | 12/2007 | Crane | G06Q 30/04 705/36 R |
| 7,536,348 | B2 * | 5/2009 | Shao | G06Q 40/00 705/40 |

(Continued)

OTHER PUBLICATIONS

"U.S. Appl. No. 16/948,993, Examiner Interview Summary mailed Apr. 12, 2022".

(Continued)

*Primary Examiner* — Olabode Akintola
(74) *Attorney, Agent, or Firm* — SCHWEGMAN LUNDBERG & WOESSNER, P.A.

(57) ABSTRACT

Disclosed in some examples, are methods, systems, and machine-readable mediums which build and utilize an artificial intelligence model to predict debtor payment timing. The past debtor payment history and other debtor information may be for a plurality of accounts over a past time period. Once the model is created, it may be used when a debtor misses a payment to determine a prediction of when the debtor will pay. The model uses characteristics of past debtors and their payment dates to predict, based upon the characteristics of the late debtor, when the late debtor will make a payment. The predicted timing may include a predicted probability for whether the payment will be made within the predicted timing. The predicted timing may be a specific date, or a window (e.g., a three-day window).

20 Claims, 8 Drawing Sheets

(51) Int. Cl.
*G06Q 10/107* (2023.01)
*G06Q 30/016* (2023.01)
*G06Q 40/03* (2023.01)
*H04M 3/432* (2006.01)

(52) U.S. Cl.
CPC ........ H04M 3/432 (2013.01); *H04M 2203/40* (2013.01)

(56) References Cited

U.S. PATENT DOCUMENTS

| | | | | |
|---|---|---|---|---|
| 2008/0133405 | A1* | 6/2008 | Lyda | G06Q 40/12 705/40 |
| 2010/0100464 | A1* | 4/2010 | Ellis | G06Q 40/128 707/769 |
| 2011/0276383 | A1* | 11/2011 | Heiser, II | G06Q 30/0224 705/14.25 |
| 2018/0232814 | A1* | 8/2018 | Dey | G06Q 10/067 |
| 2020/0265443 | A1* | 8/2020 | Shah | G06Q 20/42 |

OTHER PUBLICATIONS

"U.S. Appl. No. 16/948,993, Final Office Action mailed Feb. 3, 2022".
"U.S. Appl. No. 16/948,993, Non Final Office Action mailed Oct. 13, 2021".
"U.S. Appl. No. 16/948,993, Notice of Allowance mailed Aug. 11, 2022".
"U.S. Appl. No. 16/948,993, Response filed Jan. 12, 2022 to Non Final Office Action mailed Oct. 13, 2021", 10 pgs.
"U.S. Appl. No. 16/948,993, Response filed May 3, 2022 to Final Office Action mailed Feb. 3, 2022".
"Gradient boosting", Wikipedia, [Online]. Retrieved from the Internet: <URL: https://en.wikipedia.org/wiki/Gradient_boosting>, (Accessed May 12, 2021), 9 pgs.
"Introduction to Boosted Trees", xgboost developers, [Online]. Retrieved from the Internet: <URL: https://xgboost.readthedocs.io/en/latest/tutorials/model.html>, (2020), 9 pgs.
"Modern Machine Learning Algorithms: Strengths and Weaknesses", [Online]. Retrieved from the Internet: <URL: https://elitedatascience.com/machine-learning-algorithms>, (Accessed May 12, 2021), 10 pgs.
"Scikit-learn—Machine Learning in Python", [Online]. Retrieved from the Internet: <URL: https://scikit-learn.org/stable/>, (Accessed May 13, 2021), 2 pgs.
Brownlee, Jason, "How to One Hot Encode Sequence Data in Python", Machine Learning Mastery, [Online]. Retrieved from the Internet: <URL: https://machinelearningmastery.com/how-to-one-hot-encode-sequence-data-in-python/>, (Aug. 14, 2019), 9 pgs.
Cannon, Matt, et al., "Appeal 2021-000137", Ex parte Matt Cannon, Wei Liu and Jon Wierks, (May 18, 2021), 25 pgs.
Fortmann, Scott, "Understanding the Bias-Variance Tradeoff", [Online]. Retrieved from the Internet: <URL: http://courses.washington.edu/me333afe/Bias_Variance_Tradeoff.pdf>, (Jun. 2012), 12 pgs.
Gant, Thomas, et al., "A Practical Guide to Getting started with Propensity Scores", Paper 689-2017, [Online]. Retrieved from the Internet: <URL: https://support.sas.com/resources/papers/proceedings17/0689-2017.pdf>, (2018), 10 pgs.
Pruitt, Rex, "The Applied Use of Population Stability Index (PSI) in SAS® Enterprise Miner™", Paper 288-2010, [Online]. Retrieved from the Internet: <URL: http://support.sas.com/resources/papers/proceedings10/288-2010.pdf>, (2010), 15 pgs.
Zhixiao, Alec, "Examining Distributional Shifts by Using Population Stability Index (PSI) for Model Validation and Diagnosis", [Online]. Retrieved from the Internet: <URL: https://www.lexjansen.com/wuss/2017/47_Final_Paper_PDF.pdf>, (2017), 7 pgs.

\* cited by examiner

ARTIFICIAL INTELLIGENCE PAYMENT TIMING MODELS

CROSS-REFERENCE TO RELATED APPLICATION

This application is a continuation of U.S. patent application Ser. No. 16/948,993, filed Oct. 8, 2020, which is incorporated by reference herein in its entirety.

TECHNICAL FIELD

Embodiments pertain to payments, such as loan payments. Some embodiments pertain to constructing and employing artificial intelligence models to predict a date on which a payment is to be made. Additional embodiments pertain to using the predicted date to modify a debtor contact.

BACKGROUND

Payment obligations may arise from a variety of contracts. For example, loans such as home loans are normally structured with periodic payments on agreed upon dates on which the lender expects payment to be made by the debtor. For example, many home loans are monthly in nature where the debtor makes a payment once a month. Similarly, revolving charges, like credit cards, typically also have monthly payments. Other payment obligations not involving debt may include monthly services payments such as cable, telephone, internet, and other bills.

Once a payment is past-due, the creditor may employ one or more representatives to contact the debtor and prompt them to make a payment. While these contacts successfully encourage many debtors to pay, these contacts are not always seen as desirable by the debtor and may damage the relationship with the creditor. These debtor contacts are also expensive—especially for large creditors that may have millions of debtors.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
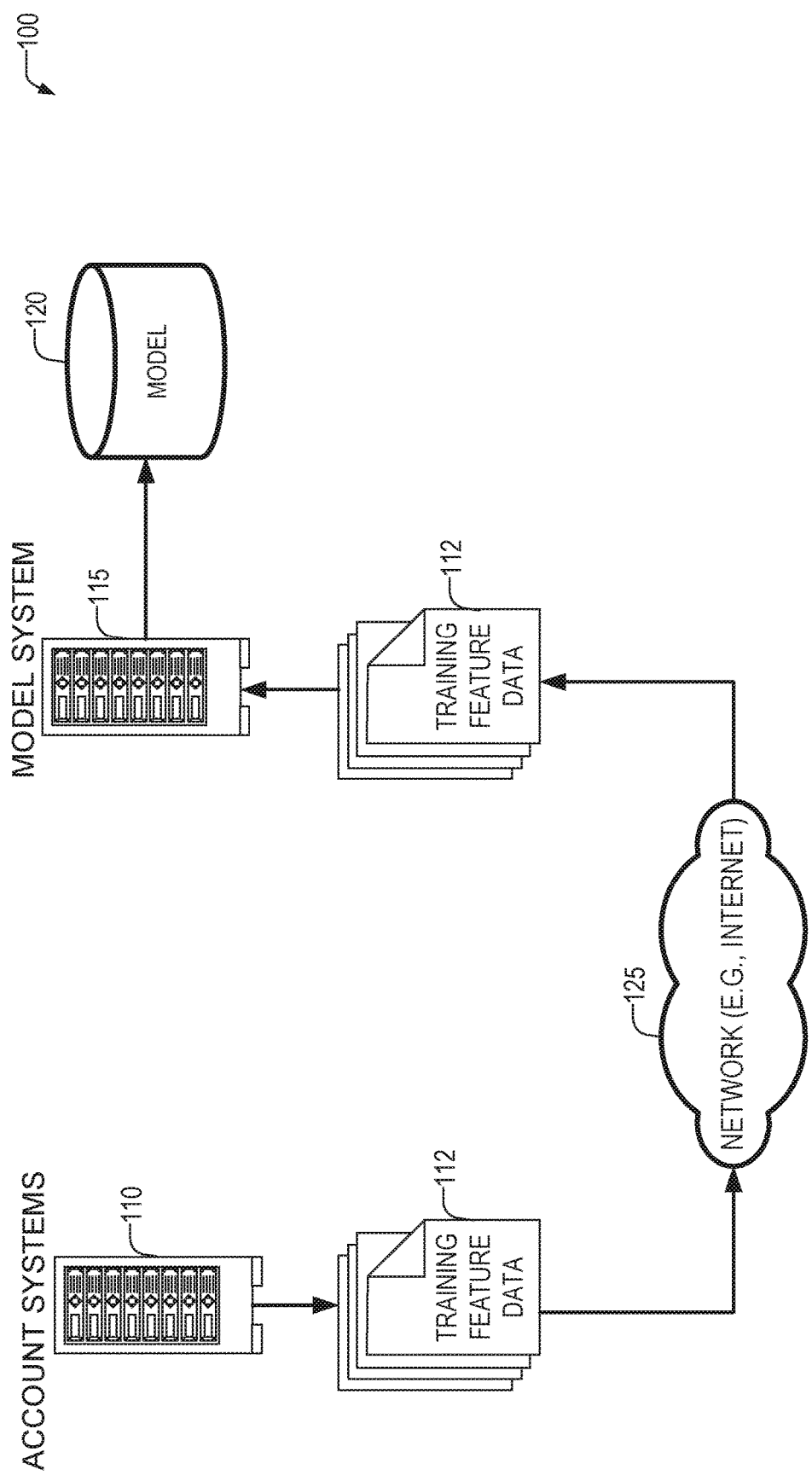
FIG. 1 illustrates an example model creation system according to some examples of the present disclosure.

In many cases, despite being late, debtors make payments on a consistent date within a small time-window. For example, the payments may be made based upon a timing of their paychecks. When debtors are called regarding their late payments, they often get upset because they believe that the lender should be able to discern these payment patterns. Unfortunately, due to the millions of debtors that a lender may handle, and because the cyclical patterns may not be discernable by a human, this may not be possible.

Disclosed in some examples, are methods, systems, and machine-readable mediums which build and utilize an artificial intelligence model to predict debtor payment timing. For example, past debtor payment history and other debtor information may be used as input to build a machine-learned model. The past debtor payment history and other debtor information may be for a plurality of accounts over a past time period. Once the model is created, it may be used when a debtor misses a payment to determine a prediction of when the debtor will pay. The model uses characteristics of past debtors and their payment dates to predict, based upon the characteristics of the late debtor, when the late debtor will make a payment. In some examples, the model may be a gradient boosted tree (GBT) regression model. The predicted timing may include a predicted probability for whether the payment will be made within the predicted timing. The predicted timing may be a specific date, or a window (e.g., a three-day window).

In some examples, the predicted timing may be used to modify a debtor contact. A debtor contact is where the creditor, or a representative of the creditor, inquires to the debtor about the missed payment. The predicted payment timing may be used modify a content of the contact (e.g., such as by modifying a call script or email text); modifying a type of the debtor contact (e.g., changing it from a call to an email); modifications to the timing of the contact (e.g., changing the date the contact is made); stopping a contact; or the like. In some examples, the model may be used to analyze debtor payment schedules to modify the obligation to better align with when the debtor pays. For example, by changing when a payment is due.

As noted, one modification is to change the content of the contact by modifying a call script. The creditor's representative (e.g., a customer service agent) may be prompted to include information on the predicted payment, such as one or more queries about the predicted payment date. For example, the creditor's representative may be prompted to ask whether the debtor expects to make the payment during the predicted payment window. In other examples, the debtor contact may be delayed until a time where the contact is proximate to the predicted payment window—for example, by changing a data structure at a contact center to change a timing based upon the predicted payment window. In some examples, the contact may be made just before (e.g., within a threshold number of days—such as two—to the first day of the predicted window), during the predicted window, or just after the predicted window (e.g., the next day following the predicted window). In some examples, the debtor contact may be made proximate to the predicted payment window. In some examples, by making collection efforts proximate to the predicted payment date, effectiveness of the collection contacts may be increased.

FIG. 1 illustrates an example model creation system 100 according to some examples of the present disclosure. Model system 115 may request training feature data 112 from account systems 110. The training feature data 112 may include payment history of accounts serviced by the account systems 110 over a past time period (e.g., 12 months); obligation details (such as the loan type); individual debtor financial history (e.g., a number of insufficient funds for the user, late fees paid, number of late events) in the past time period; whether the debtor experienced a life event within a past time period (e.g., 12 months); and the like. This information may be transmitted across one or more networks 125. Networks 125 may include the internet, an intranet, or the like. Model system 115 uses the training feature data 112 to create model 120. For example, the model system 115 may include the training module 310 of FIG. 3 which will be discussed later.

Figure 2:
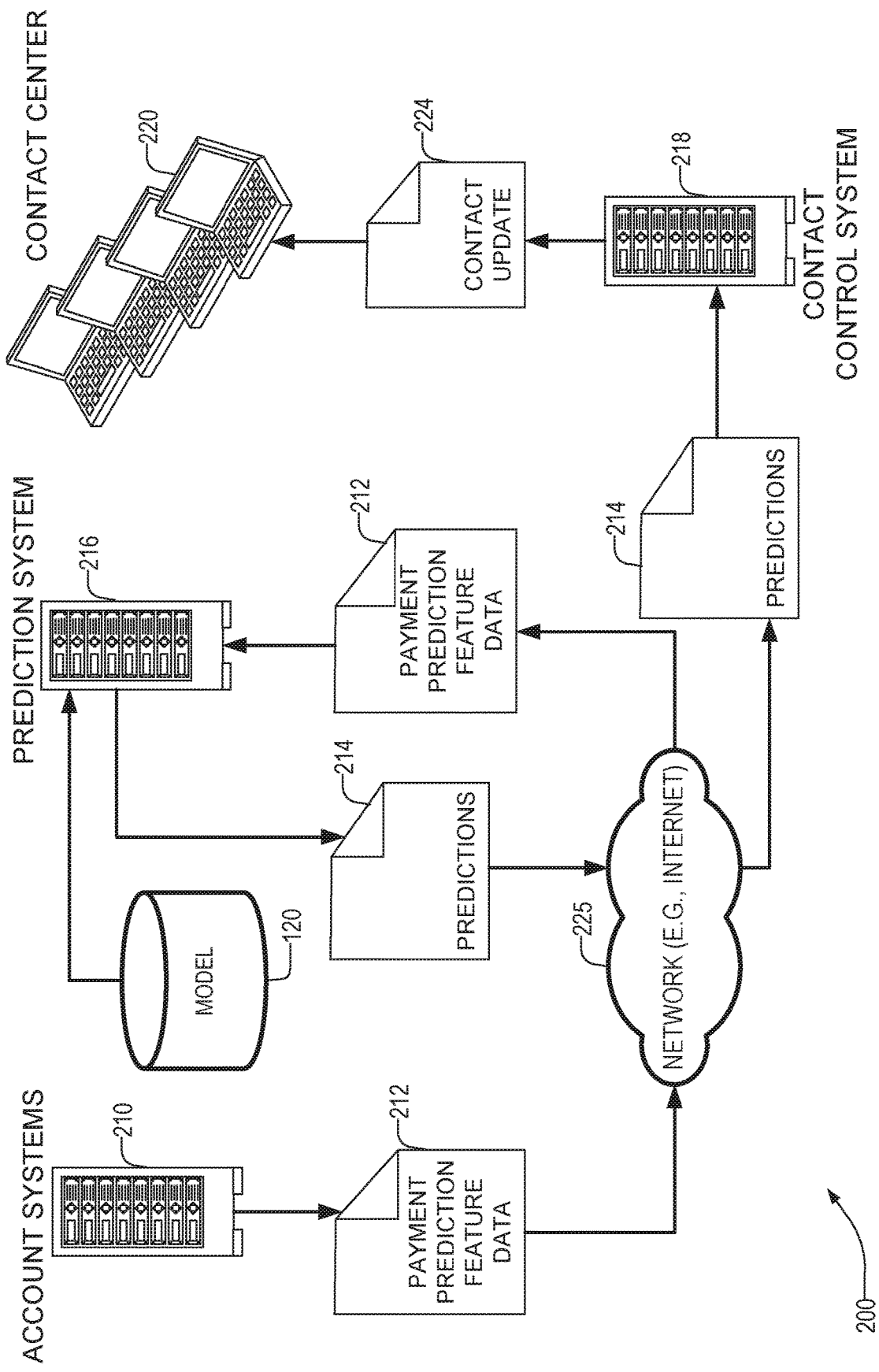
FIG. 2 illustrates an example prediction system according to some examples of the present disclosure.

Once the model is created, the model may be used in one or more prediction systems 216. FIG. 2 illustrates an example prediction system 200 according to some examples of the present disclosure. Account systems 210 may send payment prediction feature data 212 to prediction system 216. This payment prediction feature data 212 may be feature information about one or more accounts with payments that are past their payment date. This payment prediction feature data 212 may be a single message containing prediction feature data for all accounts that are late, or there may be a single message for each late account. For each account, the payment prediction feature data 212 may include prediction features, such as payment history over a past time period (e.g., 12 months); obligation details (such as the loan type); individual debtor financial history (e.g., a number of insufficient funds for the user, late fees paid, number of late events) in the past time period; whether the debtor experienced a life event within a past time period (e.g., 12 months); and the like This payment prediction feature data 212 may be sent through the network 225 to the prediction system 216. Prediction system 216 may be a same or different system then model system 115. Prediction system uses the model 120 created by the model system 115 and the payment prediction feature data 212 to predict when one or more accounts identified by the payment prediction feature data 212 are likely to make a payment. For example, prediction system 216 may include prediction module 320 from FIG. 3. Prediction system 216 may make payment date predictions 214, which may be sent over the network 225 to a contact control system 218.

Contact control system 218 may utilize the predictions to make one or more contact updates 224. Contact updates 224 may be an update to a call script to the debtor of one of the late accounts, an update to when a contact is made, both an update to the call script and when the contact is made, a modification of the type of contact (e.g., a live call, an email, a text message, or the like), or other updates to the contact for one or more computing devices in a contact center 220. For example, the script may be updated to reference the predicted payment and obtain assurances that the debtor will pay during the predicted interval. In other examples, the date of the contact may be updated to be near the time the predicted payment is to be made. For example, the system may send an email just prior to the predicted payment window reminding the debtor to make a payment, but may follow up with a live call when the predicted payment window has expired if a payment still has not been made.

As noted, the payment prediction feature data 212 may include information on multiple late accounts. In these examples, the predictions 214 may be a list of predictions for one or more of the accounts identified in the payment prediction feature data 212. In other examples, a separate prediction may be sent for each of the accounts identified in the payment prediction feature data 212. Additionally, the contact update 224 may be a single update for all contact changes but in other examples, the contact update 224 may update more than one contact (e.g., more than one contact per account, more than one account, or the like). In some examples, the prediction system 216 may produce a plurality of predictions in parallel, using parallel processing. This may reduce the time it takes to process millions of late accounts to quickly and accurately produce payment date estimates. In these examples, the multiple copies of the model 120 may be used for each thread that is creating payment date estimations.

Figure 3:
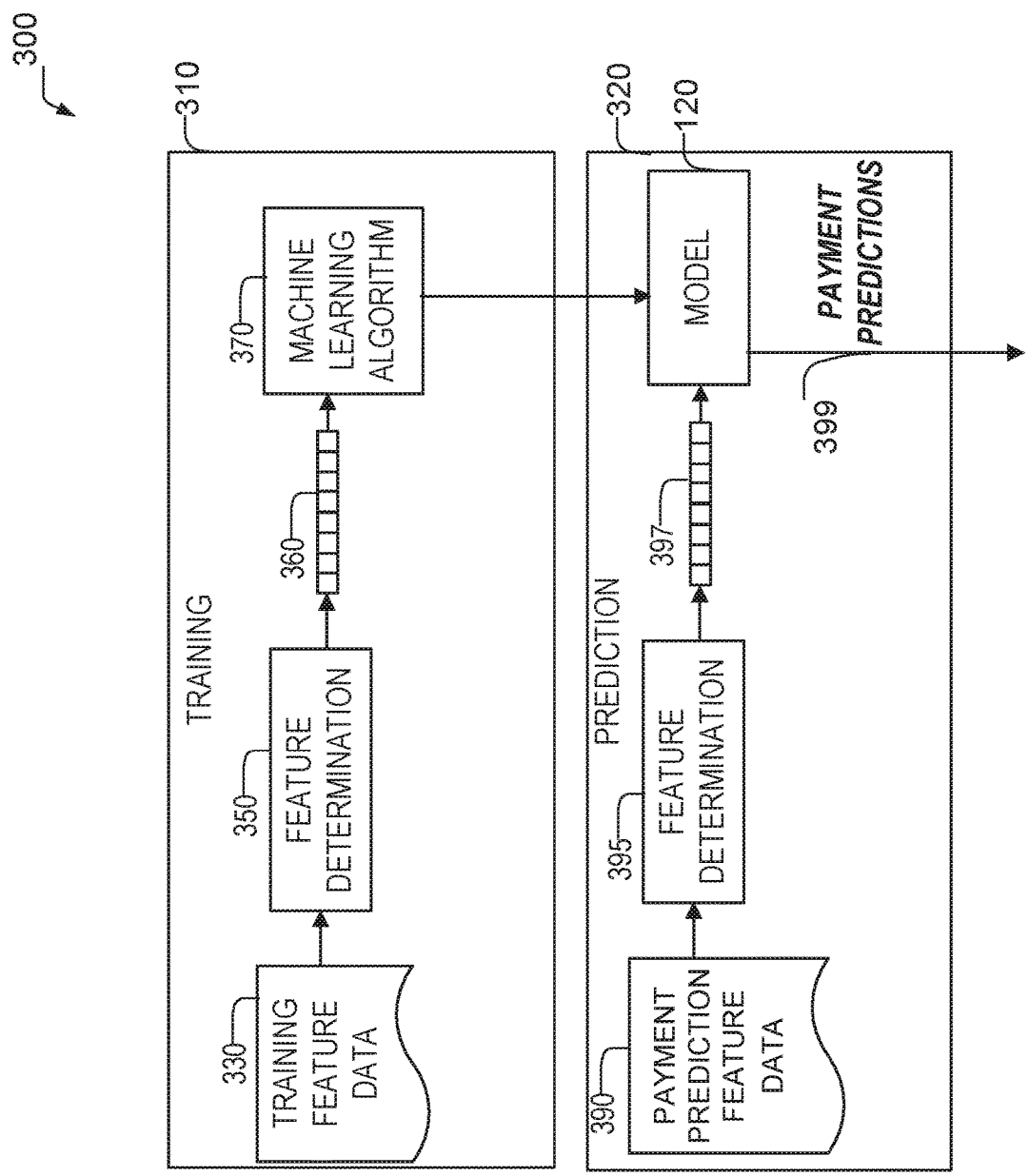
FIG. 3 shows an example machine learning module according to some examples of the present disclosure.

FIG. 3 shows an example machine learning module 300 according to some examples of the present disclosure. The machine learning module 300 may be implemented in whole or in part by one or more computing devices such as model system 115 and prediction system 216. In some examples, the training module 310 may be implemented by a different device than the prediction module 320. In these examples, the model 120 may be created on a first machine and then sent to a second machine.

Machine learning module 300 utilizes a training module 310 and a prediction module 320. Training module 310 inputs training feature data 330 into feature determination module 350. The training feature data 330 may include data determined to be predictive of when a payment will be made. Categories of training feature data may include payment history over a past time period (e.g., 12 months); obligation details (such as the loan type); individual debtor financial history (e.g., a number of insufficient funds for the borrower, late fees paid, number of late events) in the past time period; whether the debtor experienced a life event within a past time period (e.g., 12 months); and the like. In some examples, the financial history of the debtor may only utilize financial history of the account that is overdue, but in other examples, other account history of other accounts (e.g., checking, savings, and the like) may also be used. For example, a history of deposits into a checking or savings account may be predictive of when a payment will be made. In still other examples, financial history of one or more related persons may also be used, such as for example, a cosigner of the obligation.

Specific training feature data and payment prediction feature data 390 may include, for example one or more of: the standard deviation of the date of a payment over a past time period (e.g., over the past year); average date of payment over the past time period; specific payment dates for each payment made over the past time period; an indicator of the loan investor (e.g., Federal Housing Authority (FHA), Federal Home Lone Mortgage Company (FHLMC), and the like); personal financial history such as a count of the number of non-sufficient funds (NSF) in the past time period; information on the number and/or amount of late charges paid in the last time period; number of life events in a past time period; number of loan modifications in the past time period; count of the days since the most recent modification in the past time period; an indicator of whether the debtor experienced a disaster in past 12 months; a number of days since the last disaster in the past time period; a number of months since the loan was funded; a number of times the loan was delinquent in the last 12 months; an indicator of how payments were made in the past time period (e.g., in person, online, and the like).

Feature determination module 350 selects training vector 360 from the training feature data 330. The selected data may fill training vector 360 and comprises a set of the training feature data that is determined to be predictive of a payment date. In some examples, the tasks performed by the feature determination module 350 may be performed by the machine learning algorithm 370 as part of the learning process. Feature determination module 350 may remove one or more features that are not predictive of a payment date prior to training the model 120. This may produce a more accurate model that may converge faster. Information chosen for inclusion in the training vector 360 may be all the training feature data 330 or in some examples, may be a subset of all the training feature data 330.

In other examples, the feature determination module 350 may perform one or more data standardization, cleanup, or other tasks such as encoding non numerical features. For example, for categorical feature data, the feature determination module 350 may convert these features to numbers. For example, payment method has no ordinal relationship so integer encoding cannot be used. For example, say the values for Payment Method are "On-Line", "Phone" and "Branch". Assigning the integers "1", "2" and "3" respectively would allow the representation to learn on a meaningless relationship that could compromise the model. In other examples, other encodings such as "One Hot Encoding" may be used to convert the categorical feature data to numbers. This enables a representation of the categorical variables as binary vectors and provided a "probability-like" number for each label value to give the model more expressive power. One hot encoding represents a category as a vector whereby each possible category value is represented by one element in the vector. When the data is equal to that category value, the value of the vector is a '1' and all other elements are zero (or vice versa). For example, in the payment method group, if the possible values are [online, phone, branch], a payment made online is represented by a vector [1,0,0]; similarly a branch payment is represented by a vector of [0,0,1].

The training vector 360 may be utilized (along with any applicable labels) by the machine learning algorithm 370 to produce a model 120. In some examples, other data structures other than vectors may be used. The machine learning algorithm 370 may learn one or more layers of a model. Example layers may include convolutional layers, dropout layers, pooling/up sampling layers, SoftMax layers, and the like. Example models may be a neural network, where each layer is comprised of a plurality of neurons that take a plurality of inputs, weight the inputs, input the weighted inputs into an activation function to produce an output which may then be sent to another layer. Example activation functions may include a Rectified Linear Unit (ReLu), and the like. Layers of the model may be fully or partially connected. In other examples, machine learning algorithm may be a gradient boosted tree and the model may be one or more data structures that describe the resultant nodes, leaves, edges, and the like of the tree.

In the prediction module 320, payment prediction feature data 390 may be input to the feature determination module 395. The payment prediction feature data 390 may include the data described above for the training feature data, but for a specific account that is late on their payment. In some examples, the prediction module 320 may be run sequentially for one or more late accounts (e.g., each late account). Each run, the payment prediction feature data 390 may be data specific to the account for which a payment prediction is being run predicted. Feature determination module 395 may operate the same, or differently than feature determination module 350. In some examples, feature determination modules 350 and 395 are the same modules or different instances of the same module. Feature determination module 395 produces vector 397, which is input into the model 120 to produce an estimated payment date or range 399. For example, the weightings and/or network structure learned by the training module 310 may be executed on the vector 397 by applying vector 397 to a first layer of the model 120 to produce inputs to a second layer of the model 120, and so on until the estimated payment date or range 399 is output. As previously noted, other data structures may be used other than a vector (e.g., a matrix).

The training module 310 may operate in an offline manner to train the model 120. The prediction module 320, however, may be designed to operate in an online manner. It should be noted that the model 120 may be periodically updated via additional training and/or user feedback. For example, additional training feature data 330 may be collected. For example, the actual payment date may be used as a label for the payment prediction feature data that is then used to refine the model. The feedback, along with the payment prediction feature data 390 corresponding to that feedback, may be used to refine the model by the training module 310.

The machine learning algorithm 370 may be selected from among many different potential supervised or unsupervised machine learning algorithms. Examples of learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, gradient boosted tree, linear classifiers, quadratic classifiers, k-nearest neighbor, linear regression, logistic regression, a region based CNN, a full CNN (for semantic segmentation), a mask R-CNN algorithm for instance segmentation, and hidden Markov models. Examples of unsupervised learning algorithms include expectation-maximization algorithms, vector quantization, and information bottleneck method.

Figure 4:
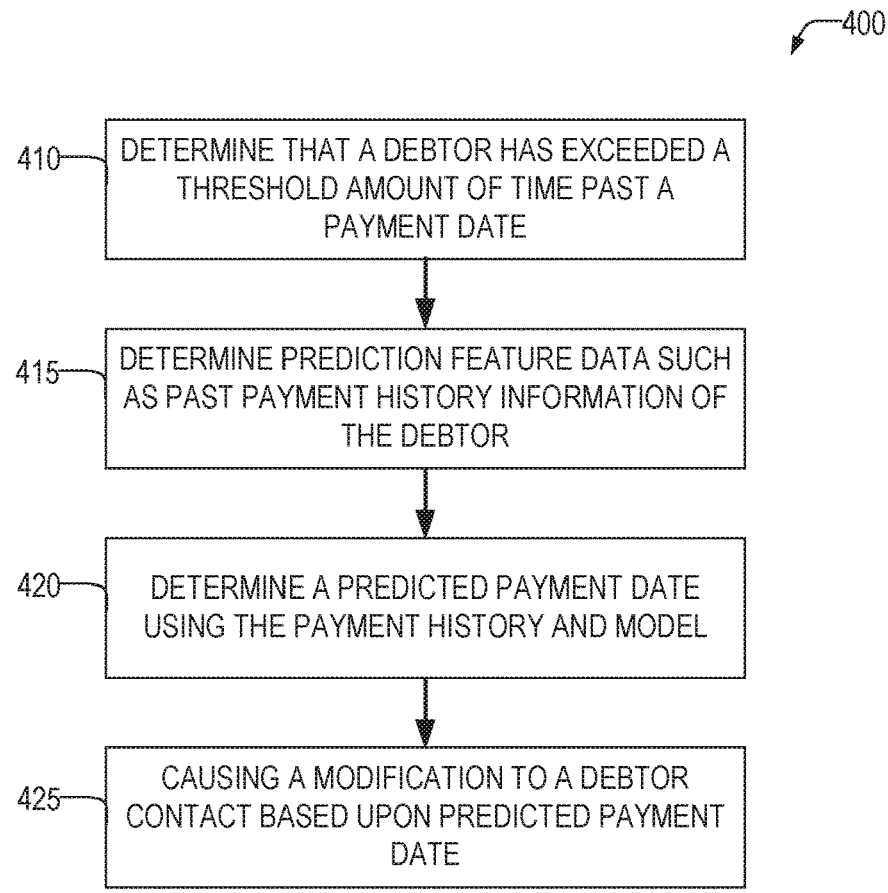
FIG. 4 illustrates a flowchart of a method of producing a predicted payment date and modifying a debtor contact according to some examples of the present disclosure.

FIG. 4 illustrates a flowchart of a method 400 of producing a predicted payment date and modifying a debtor contact according to some examples of the present disclosure. At operation 410 the system may determine that a debtor has exceeded a threshold amount of time past a payment date without making a payment. For example, if the payment is late by a threshold number of days (e.g., two). At operation 415, the system may determine prediction feature data. For example, determine payment history information of the debtor and other data.

Specific payment history information may include one or more of: the standard deviation of the date of a PITI payment over the last 12 months; average date PITI payment over the last 12 months; 2 months previous PITI payment date; 3 months previous PITI payment date; 4 months previous PITI payment date; 5 months previous PITI payment date; 6 months previous PITI payment date; 7 months previous PITI payment date; 8 months previous PITI payment date; 9 months previous PITI payment date; 10 months previous PITI payment date; 11 months previous PITI payment date; 12 months previous PITI payment date; indicator of the loan investor (e.g., FHA, FHLMC, FNMA, Private, Unknown VA, WO WF, WF); the count of the number of NSF in the past 12 months; the number of late charges paid in the last 12 months; sum of late charges paid in the last 12 months; number of life events in the past 2 months; number of modifications in the past 12 months; count of the days since the most recent modification in the past 12 months; binary indicator of disaster in past 12 months; number of days since the last disaster in past 12 months; number of months since the loan was funded; number of times the loan was delinquent in the last 12 months; or an indicator if one of the past 6 months payments was made "in house", "lockbox", "branch", "recurring" "one time draft" "phone" "online", "billpay", "thirdparty", "bankruptcy", "wire";

At operation 420, the prediction feature data may be used as input to the payment model to determine a predicted payment. For example, the prediction feature data may be used to evaluate one or more nodes of a gradient boosted tree to determine a payment date. In other examples, where the model is a neural network the prediction feature data may be weighted and input to one or more neurons of the model. The input may be evaluated using the activation function, which then produces an output that may be used as input to a second layer of the neural network and so on.

At operation 425, the predicted payment date may be used to modify a debtor contact data structure. For example, by changing a timing of the contact, changing a type of the contact, changing a call script or content for the contact, and the like.

Figure 5:
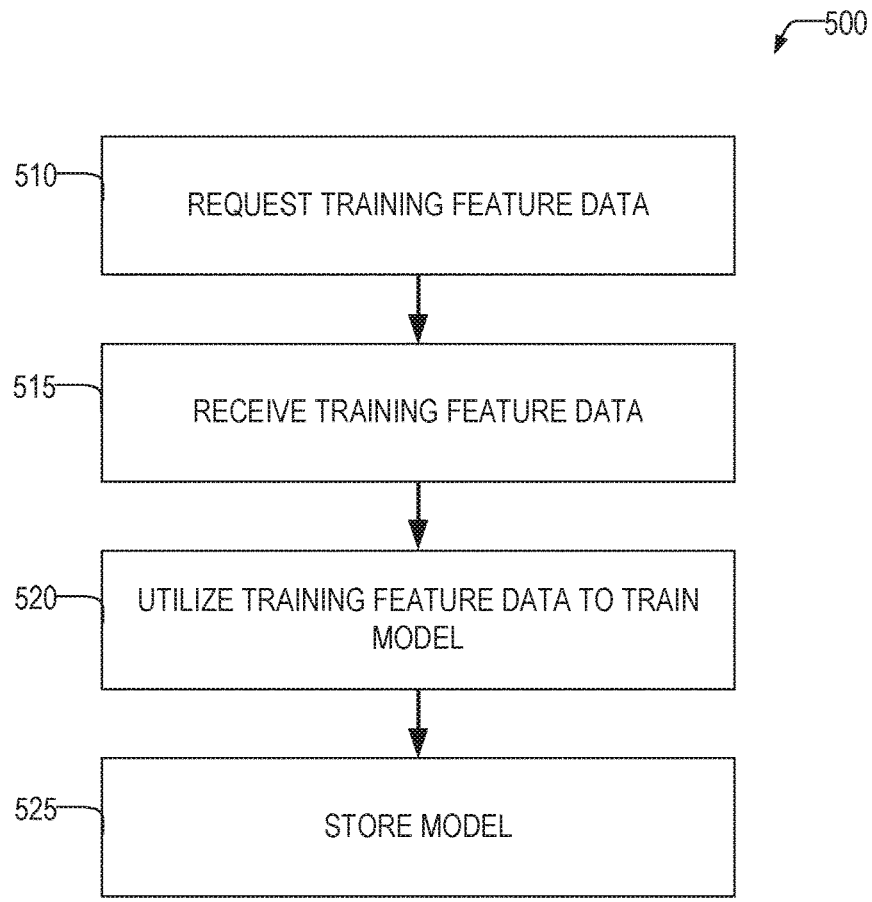
FIG. 5 illustrates a flowchart of a method of training a model to predict payment timing according to some examples of the present disclosure.

FIG. 5 illustrates a flowchart of a method 500 of training a model to predict payment timing according to some examples of the present disclosure. At operation 510 the training module (e.g., training module 310 as implemented by a model system such as model system 115) may request training feature data, from one or more account systems, such as account system 110. At operation 515 the training module may receive the training feature data. The training feature data may be processed using more data standardization, cleanup, or other tasks such as encoding non numerical features (e.g., one hot encoding). At operation 520, the training model may use the training feature data to train the model. For example, by creating a gradient boosted tree, neural network, or the like. At operation 525 the model may be stored in a storage device. In some examples in which the training operations and predictions are done on separate computing devices, the model may be transmitted to a computing device doing predictions.

Figure 6:
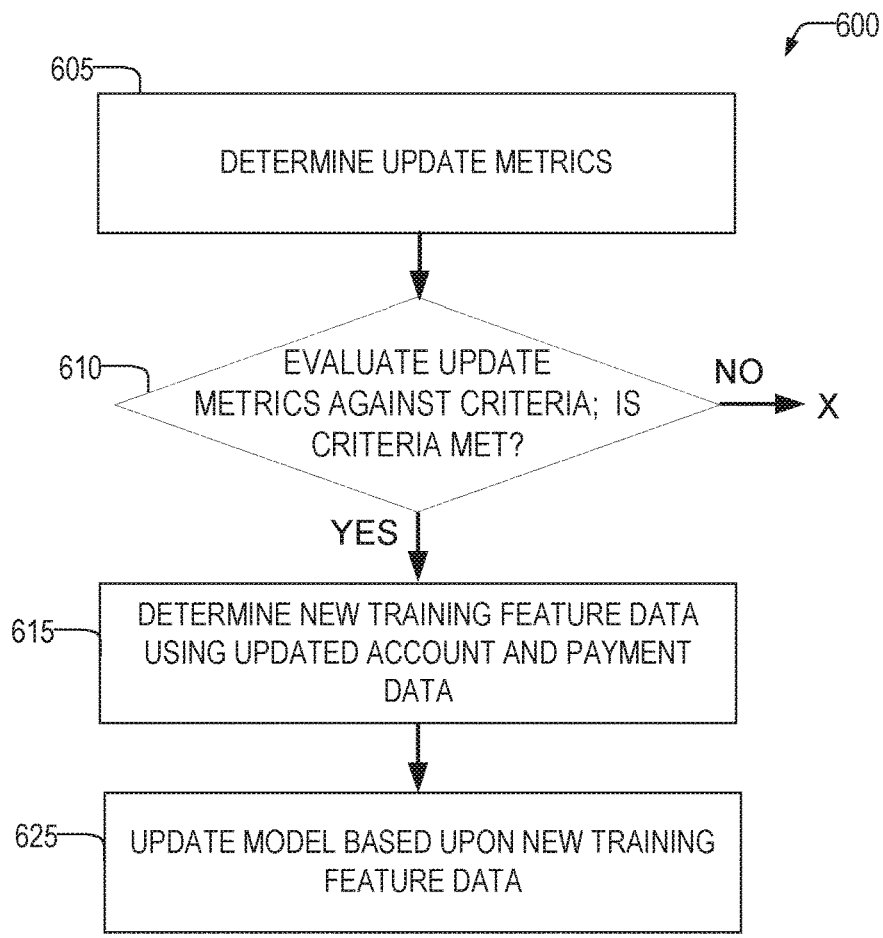
FIG. 6 illustrates a flowchart of a method of updating the model according to some examples of the present disclosure.

FIG. 6 illustrates a flowchart of a method 600 of updating the model according to some examples of the present disclosure. At operation 605 the system may determine one or more update metrics. For example, one or more of: a time since a last update, an error rate of the model (e.g., the prediction compared to the actual payment), a debtor satisfaction metric, or the like. At operation 610 the system may evaluate the update metrics against one or more update criteria to determine if one or more update criteria are met. For example, a performance metric of the model may be monitored and compared with a threshold performance metric. For example, if an error rate exceeds a threshold or a time since the last update exceeds a threshold. The error rate may be an error rate for a single prediction (that is, a single prediction that is over a threshold error rate triggers a model update). In other examples, the error rate may be over a plurality of predictions or for a period of time. That is, the error rate over N predictions (N>1) or the error rate over T time. In still other examples, the model may be updated when either a single prediction's error rate exceeds a first threshold, or when the error rate over a plurality of predictions or a period of time exceeds a second threshold.

In other examples, an average difference between the predicted payment date and the actual payment date for one or more predictions (for one or more accounts) over a predetermined period of time may be the performance metric and the updating criteria may be a threshold. That is, if an average difference between the predicted payment date and the actual payment date for one or more predictions (for one or more accounts) over a predetermined period of time is over the threshold, the model may be updated. In other examples, other performance metrics may be used instead, or in addition to the difference in the predicted payment dates and the actual dates such as debtor satisfaction. That is, low debtor satisfaction, either by itself, or in combination with other metrics, may cause a retraining of the model. In still other examples, the update criteria may be a passing of a predetermined threshold amount of time (e.g., every 2 months the model is updated).

At operation 615, the system may determine new or updated training feature data which may include information about actual payment dates. This may be the same training feature data as previously described, but including additional and updated data from actual payments. In other examples, in addition to, or instead of updated training feature data, the model may be updated using the previous training feature data and an error metric or function that indicates the error for various predictions. At operation 625, this data be used to update the model. For example, a new model may be trained with the updated data, or the old model may be modified.

In some examples, in order to track performance of the model, performance tracking and outcome analysis may be employed. For example, a study group and a control group of accounts may be used to determine performance metrics. For example, a net loyalty which may be defined as the difference in the number of debtors who expressed loyalty and disloyalty in surveys conducted during a predetermined time period (e.g., 30 days) following a change in scripted calls. Another metric may be complaint rates. The collection period may be standardized for each test group as 60 days following the initial outreach contact. A population rate per 1,000 at-risk accounts will be calculated due to the statistically rare occurrences of complaints as follows:

$$X=(Ex/N)(1,000)$$

Where:
X=Rate of complaints per 1,000 at-risk accounts
$\Sigma x$=Total complaints during the collection period
N=Total at-risk accounts Yet another metric may be a roll rate—a number of debtors who increased their payments missed as of the second day of the following month:

$$X = \frac{\sum(p)}{\sum(P)}$$

Where:
X=Ratio of Roll Rate
$\Sigma(p)$=Sum of all debtors who increased number of payments due at end of the month
$\Sigma(P)$=Sum of all debtors in each group The outcome metrics may be evaluated in a variety of ways. For example, using a paired sample t-test that employs a matched-pair study design that uses Propensity Score Matching to control for selection bias. A paired sample t-test will be used to evaluate whether the means of the pair of values in the two independent Test Groups for Average days from payment date to collection date differ. Another example includes a proportion comparison. A comparison of the population's proportions will be used for the remaining outcome metrics according to the formula:

$$z = \frac{\hat{p}_1 - \hat{p}_2}{\sqrt{\hat{p}(1-\hat{p})\left(\frac{1}{m} + \frac{1}{n}\right)}}$$

Where:

$$\hat{p}_1 = \frac{x}{m} = x \text{ successes in } m \text{ independent trials}$$

$$\hat{p}_2 = \frac{y}{n} = Y \text{ successes in } n \text{ independent trials}$$

$$\hat{p} = \frac{x+y}{m+n} = \text{pooled (combined) populations}$$

These metrics may be collected and used to evaluate the effectiveness of the model and may be used to determine when to train the model—for example, these metrics may be determined at operation 605 and evaluated against criteria at operation 610 to determine whether to update the model.

Figure 7:
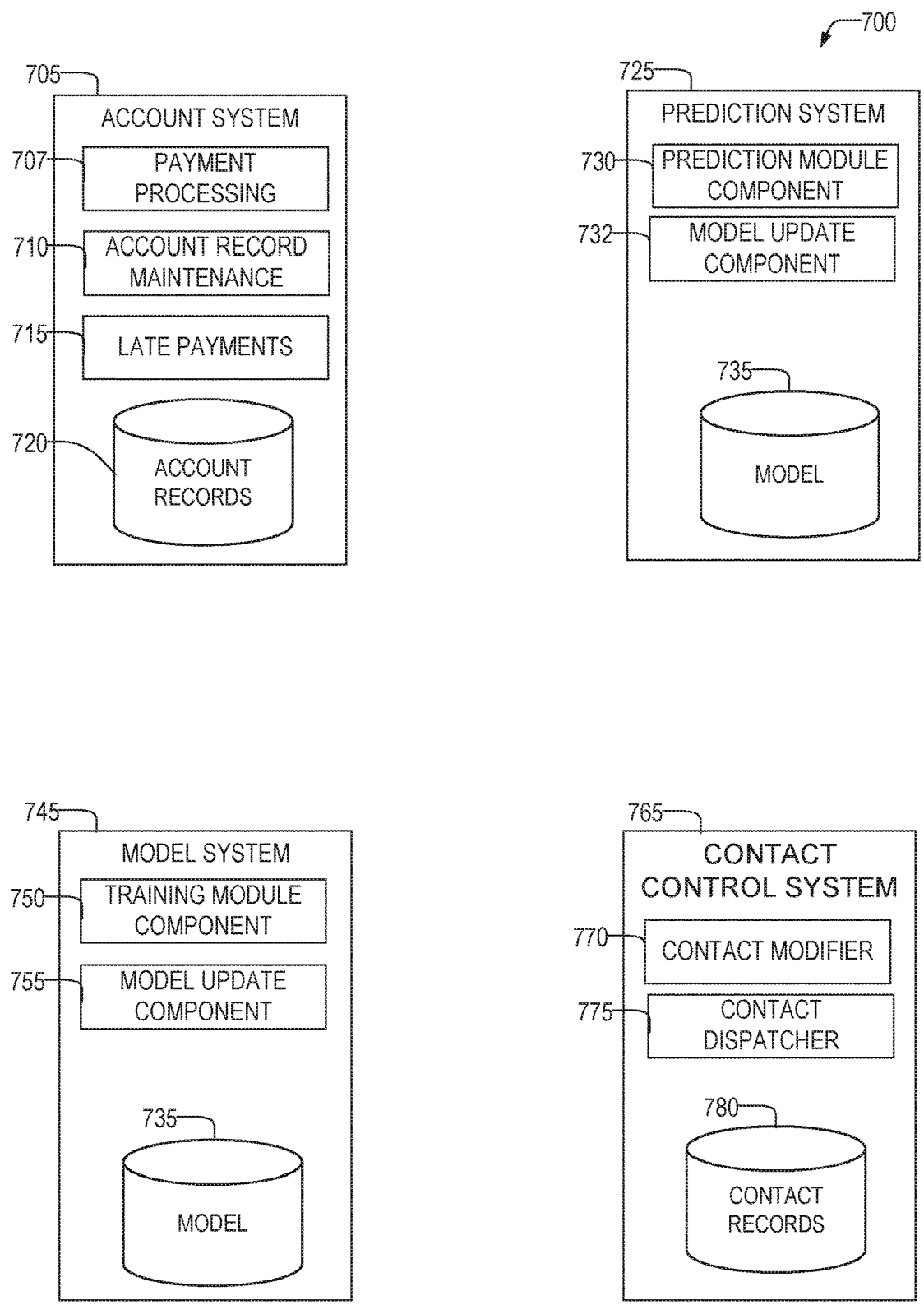
FIG. 7 illustrates a logical diagram of computing devices of the payment prediction system according to some examples of the present disclosure.

FIG. 7 illustrates a logical diagram 700 of computing devices of the payment prediction system according to some examples of the present disclosure. Components shown in FIG. 7 are illustrative and may be implemented by computing devices such as those shown in FIG. 8. The various components of FIG. 7 are shown as being performed by particular computing devices, but one of ordinary skill in the art with the benefit of the present disclosure will understand that one or more components of one or more of the computing devices may be performed by one or more of the other computing devices. For example, all the components of FIG. 7 may be performed by a same computing device.

Account system 705 may be an example of account systems 110, and 210. Account system 705 may be implemented by one or more computing devices such as described in FIG. 8. Account system 705 may be an example of account system 110 and 210. Account system 705 may track, manage, and record transactions associated with loan accounts. For example, payment processing component 707 may process payments from debtors. The payment processing component 707 may receive payments and store the record of the received payment in account records 720. The payment processing component 707 may then recalculate the amount due and the interest due on the entire loan as well as a next payment and record this in the account records 720. Account record maintenance component 710 may provide account records to web systems, branch systems, and other systems of a financial institution to enable servicing loans. Account record maintenance component 710 may maintain the records and ensure they are secure and protected from loss or deletion. Late payments component 715 identifies accounts where a threshold amount of time has passed after a payment is due where a payment was not made in full. The late payments component 715 then creates the payment prediction feature data 212 for these accounts and sends these to the prediction system.

Figure 8:
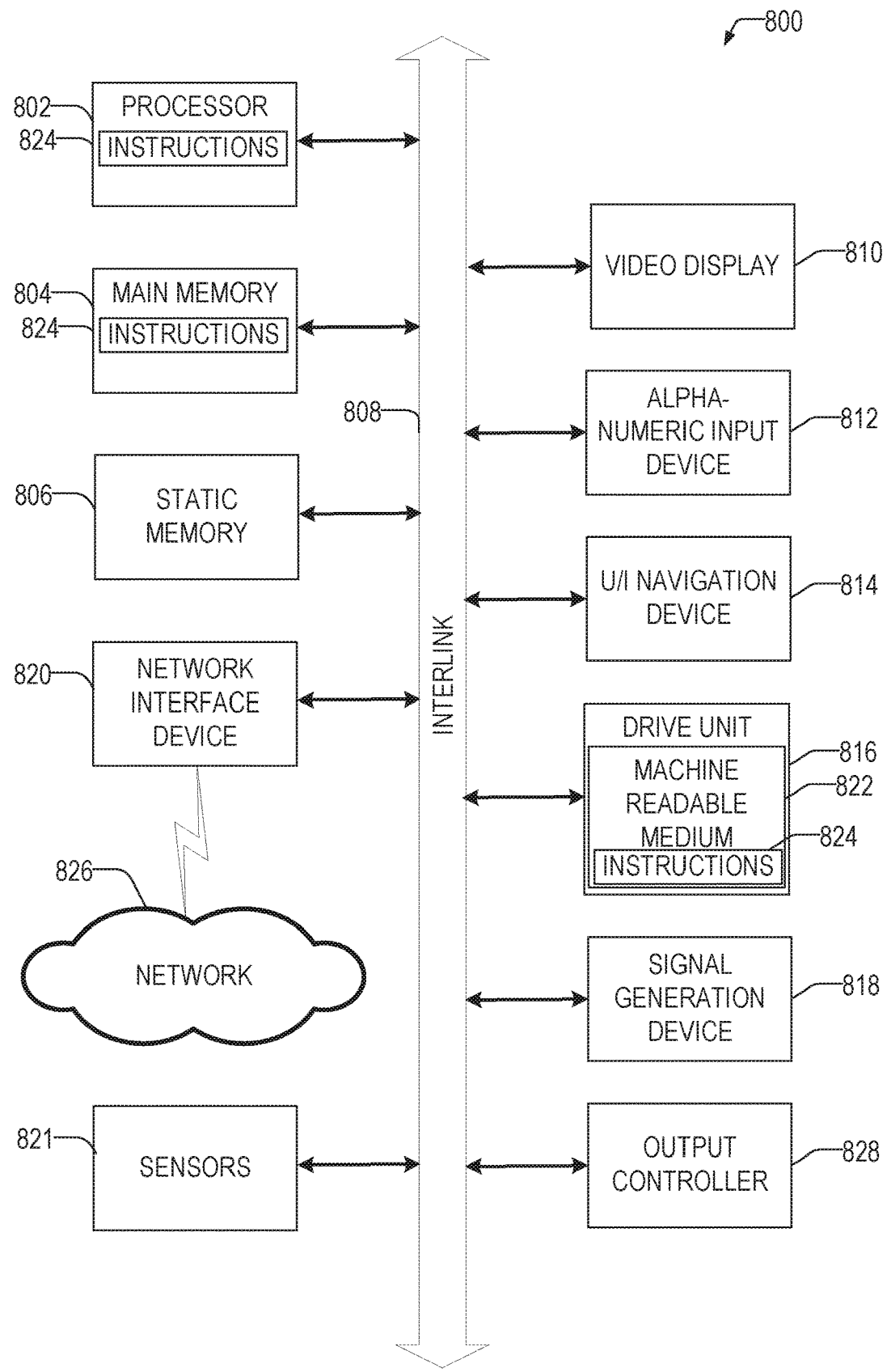
FIG. 8 is a block diagram illustrating an example of a machine upon which one or more embodiments may be implemented.

Prediction system 725 may be implemented by one or more computing devices such as described in FIG. 8. Prediction system 725 may be an example of prediction system 216 of FIG. 2. Prediction system 725 may have a prediction module component 730, which may be a prediction module 320 from FIG. 3. The Prediction module component 730 may use the payment prediction feature data 390 and the model 735 to make a prediction. The prediction may be sent back to the account system 705 (which may store it with the account records 720 who may then contact the contact control system 765 to modify the contact) or may be sent directly to the contact control system 765. Model update component 732 may handle updates to the model 735 by receiving, from the model system 745, updates to the model 735, and applying those updates.

Model system 745 may be an example of model system 115 and may be implemented by one or more computing devices, such as described in FIG. 8. Model system 745 may include training module component 750 which may be an example of training module 310 of FIG. 3. Training module component 750 may communicate with account system 705 to obtain training feature data 112 which it uses to create the model 735. The model update component 755 communicates the newly trained model to the prediction system 725. Model update component 755 may also work with model update component 732 to update the model 735 by determining when to update the model and obtaining additional training feature data not originally used to train the model. The model update component 755 may use this additional training feature data and instruct the training module component 750 to retrain the model.

Contact control system 765 may include a contact modifier 770 which may modify one or more debtor contacts based upon the predicted payment. For example, the prediction system 725 may send the predicted payment dates to the contact modifier 770 of the contact control system 765. Contact modifier 770 may use one or more rules to modify the contact based upon the predicted payment date. The rules may be set by an administrator and may be a series of "if then" rules that use information about the payment, the debtor, and the predicted payment date to determine whether to modify the contact and what to change about the contact. For example, "if the predicted payment is in less than three days, then do not contact the debtor until after the three days." Contacts may be modified by updating the contact records 780 to change a date, type, and content of the contact. For example, a default call script may be modified or changed to a modified script; a contact date in the contact records may be updated; a contact type in the contact records; or the like. Contact dispatcher 775 may consult the contact records to determine when to initiate a contact. The contact dispatcher 775 may message one or more contact center devices, such as computing devices 220.

In some examples, additional contact modifications may be to investigate the account to determine, if the predicted payment was lapsed, if a payment was misapplied to a different debt or obligation. For example, the debtor or the creditor may have accidentally made the payment to a different obligation or account. In some examples, the system may look for a payment that was misapplied and reapply the payment to the correct obligation. For example, the system may look for the exact amount due and see that it was applied to a different obligation that had a different amount due. This may entail reversing the payment to the incorrect obligation and reapplying the payment to the correct obligation.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may implement one or more of account system 110, 210, 705; model system 115, 745; prediction system 216, 725; contact control system 218, 765; or contact center computing devices 220. Machine 800 may implement the training and prediction modules 310, 320 (e.g., as software or dedicated hardware) and may be configured to perform the methods of FIGS. 4-6. The machine 800 may be in the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The Machine 800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

Other Notes and Examples

Example 1 is a method for modifying a contact based upon a predicted payment date, the method comprising: using a hardware processor to perform operations comprising: determining that a debtor has exceeded a threshold amount of time past a payment date of an obligation without making a payment; determining past payment history information of the debtor; determining a predicted payment date using the payment history information and a payment model, the payment model a data structure created through a training process run on a training data set comprising past payment history of a plurality of other debtors; and causing a modification to a contact to the debtor, the modification based upon the predicted payment date.

In Example 2, the subject matter of Example 1 includes, wherein causing a modification to the contact to the debtor comprises instructing a contact center system to delay a contact until after expiry of the predicted payment date.

In Example 3, the subject matter of Examples 1-2 includes, wherein the payment model is a regression model.

In Example 4, the subject matter of Example 3 includes, wherein the payment model is a Gradient Boosted Tree (GBT) model.

In Example 5, the subject matter of Examples 1-4 includes, wherein causing a modification to the contact comprises modifying a call script to include a prompt to ask the debtor if they are paying by the predicted payment date.

In Example 6, the subject matter of Examples 1-5 includes, wherein the method further comprises: determining that the predicted payment date has passed without the debtor making the payment; and responsive to determining that the predicted payment date has passed without the debtor making the payment, determining a plurality of other payments the debtor has made within a predetermined threshold period of time; determining that one of the plurality of other payments was misapplied; responsive to determining that the one of the plurality of other payments was misapplied, reversing the one of the plurality of other payments and applying the one of the plurality of other payments to the debt.

In Example 7, the subject matter of Examples 1-6 includes, wherein causing a modification to the contact comprises changing a format of a contact from a first format to a second format, the first and second formats comprising one of a call, an email, a text message, or a notification.

Example 8 is a computing device for modifying a contact based upon a predicted payment date, the computing device comprising: a hardware processor; a memory, the memory storing instructions, the instructions, when executed by the hardware processor, causing the computing device to perform operations comprising: determining that a debtor has exceeded a threshold amount of time past a payment date of an obligation without making a payment; determining past payment history information of the debtor; determining a predicted payment date using the payment history information and a payment model, the payment model a data structure created through a training process run on a training data set comprising past payment history of a plurality of other debtors; and causing a modification to a contact to the debtor, the modification based upon the predicted payment date.

In Example 9, the subject matter of Example 8 includes, wherein the operations of causing a modification to the contact to the debtor comprises instructing a contact center system to delay a contact until after expiry of the predicted payment date.

In Example 10, the subject matter of Examples 8-9 includes, wherein the payment model is a regression model.

In Example 11, the subject matter of Example 10 includes, wherein the payment model is a Gradient Boosted Tree (GBT) model.

In Example 12, the subject matter of Examples 8-11 includes, wherein the operations of causing a modification to the contact comprises modifying a call script to include a prompt to ask the debtor if they are paying by the predicted payment date.

In Example 13, the subject matter of Examples 8-12 includes, wherein the operations further comprise: determining that the predicted payment date has passed without the debtor making the payment; and responsive to determining that the predicted payment date has passed without the debtor making the payment, determining a plurality of other payments the debtor has made within a predetermined threshold period of time; determining that one of the plurality of other payments was misapplied; responsive to determining that the one of the plurality of other payments was misapplied, reversing the one of the plurality of other payments and applying the one of the plurality of other payments to the debt.

In Example 14, the subject matter of Examples 8-13 includes, wherein the operations of causing a modification to the contact comprises changing a format of a contact from a first format to a second format, the first and second formats comprising one of a call, an email, a text message, or a notification.

Example 15 is a non-transitory machine-readable medium storing instructions, the instructions, when executed by a machine, cause the machine to perform operations comprising: determining that a debtor has exceeded a threshold amount of time past a payment date of an obligation without making a payment; determining past payment history information of the debtor; determining a predicted payment date using the payment history information and a payment model, the payment model a data structure created through a training process run on a training data set comprising past payment history of a plurality of other debtors; and causing a modification to a contact to the debtor, the modification based upon the predicted payment date.

In Example 16, the subject matter of Example 15 includes, wherein the operations of causing a modification to the contact to the debtor comprises instructing a contact center system to delay a contact until after expiry of the predicted payment date.

In Example 17, the subject matter of Examples 15-16 includes, wherein the payment model is a regression model.

In Example 18, the subject matter of Example 17 includes, wherein the payment model is a Gradient Boosted Tree (GBT) model.

In Example 19, the subject matter of Examples 15-18 includes, wherein the operations of causing a modification to the contact comprises modifying a call script to include a prompt to ask the debtor if they are paying by the predicted payment date.

In Example 20, the subject matter of Examples 15-19 includes, wherein the operations further comprise: determining that the predicted payment date has passed without the debtor making the payment; and responsive to determining that the predicted payment date has passed without the debtor making the payment, determining a plurality of other payments the debtor has made within a predetermined threshold period of time; determining that one of the plurality of other payments was misapplied; responsive to determining that the one of the plurality of other payments was misapplied, reversing the one of the plurality of other payments and applying the one of the plurality of other payments to the debt.

In Example 21, the subject matter of Examples 8-20 includes, wherein the operations of causing a modification to the contact comprises changing a format of a contact from a first format to a second format, the first and second formats comprising one of a call, an email, a text message, or a notification.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

What is claimed is:

1. A method for modifying an obligation of a debtor based upon a predicted payment date, the method comprising:
   using a hardware processor configured to perform operations comprising:
   training a prediction model using a gradient boosted tree machine-learning algorithm based on a training data set comprising a plurality of features including past payment history of a plurality of debtors on debt accounts and information about non-debt accounts of the plurality of debtors, the training data including at least one non-numerical feature, the training comprising converting the non-numerical features into a binary vector with each position of the binary vector representing a possible value of the non-numerical features, the prediction model comprising one or more data structures;
   determining past payment history information of the debtor;
   determining account history of a non-debt account of the debtor;
   determining the predicted payment date using the past payment history information and the account history of the non-debt account of the debtor as inputs to the prediction model; and
   automatically causing a modification to a debtor payment schedule related to the debt, the modification based upon the predicted payment date, the modification changing a timing of future payments due to align with the predicted payment date.

2. The method of claim 1, wherein the training data set is labelled with a payment date of the debtor.

3. The method of claim 1, further comprising determining a probability for whether a payment will be made on the predicted payment date using the prediction model.

4. The method of claim 1, further comprising:
   modifying a data structure of a contact center to change a timing of a contact to a time proximate to the predicted payment date.

5. The method of claim 1, further comprising:
   modifying a data structure of a contact center to change a call script used when contacting the debtor based upon the predicted payment date.

6. The method of claim 1, wherein determining the predicted payment date using the past payment history information and the account history of the non-debt account of the debtor as inputs to the prediction model comprises determining a plurality of predicted payment dates for a plurality of debtors in parallel using parallel processing and a plurality of instances of the prediction model.

7. The method of claim 1, wherein determining the predicted payment date using the past payment history information and the account history of the non-debt account of the debtor as inputs to the prediction model comprises also using a financial history of one or more persons related to the debtor as input to the prediction model.

8. A device for modifying an obligation of a debtor based upon a predicted payment date, the device comprising:
   a hardware processor;
   a memory, storing instructions, which when executed by the hardware processor, causes the hardware processor to perform operations comprising:
   training a prediction model using a gradient boosted tree machine-learning algorithm based on a training data set comprising a plurality of features including past payment history of a plurality of debtors on debt accounts and information about non-debt accounts of the plurality of debtors, the training data including at least one non-numerical feature, the training comprising converting the non-numerical features into a binary vector with each position of the binary vector representing a possible value of the non-numerical features, the prediction model comprising one or more data structures;
   determining past payment history information of the debtor;
   determining account history of a non-debt account of the debtor;
   determining the predicted payment date using the past payment history information and the account history of the non-debt account of the debtor as inputs to the prediction model; and
   automatically causing a modification to a debtor payment schedule related to the debt, the modification based upon the predicted payment date, the modification changing a timing of future payments due to align with the predicted payment date.

9. The device of claim 8, wherein the training data set is labelled with a payment date of the debtor.

10. The device of claim 8, wherein the operations further comprise determining a probability for whether a payment will be made on the predicted payment date using the prediction model.

11. The device of claim 8, wherein the operations further comprise:
    modifying a data structure of a contact center to change a timing of a contact to a time proximate to the predicted payment date.

12. The device of claim 8, wherein the operations further comprise:
    modifying a data structure of a contact center to change a call script used when contacting the debtor based upon the predicted payment date.

13. The device of claim 8, wherein the operations of determining the predicted payment date using the past payment history information and the account history of the non-debt account of the debtor as inputs to the prediction model comprises determining a plurality of predicted payment dates for a plurality of debtors in parallel using parallel processing and a plurality of instances of the prediction model.

14. The device of claim 8, wherein the operations of determining the predicted payment date using the past payment history information and the account history of the non-debt account of the debtor as inputs to the prediction model comprises also using a financial history of one or more persons related to the debtor as input to the prediction model.

15. A non-transitory machine-readable medium, storing instructions for modifying an obligation of a debtor based upon a predicted payment date, the instructions, which when executed by a machine, causes the machine to perform operations comprising:
    training a prediction model using a gradient boosted tree machine-learning algorithm based on a training data set comprising a plurality of features including past payment history of a plurality of debtors on debt accounts and information about non-debt accounts of the plurality of debtors, the training data including at least one non-numerical feature, the training comprising converting the non-numerical features into a binary vector with each position of the binary vector representing a possible value of the non-numerical features, the prediction model comprising one or more data structures;
    determining past payment history information of the debtor;
    determining account history of a non-debt account of the debtor;
    determining the predicted payment date using the past payment history information and the account history of the non-debt account of the debtor as inputs to the prediction model; and
    automatically causing a modification to a debtor payment schedule related to the debt, the modification based upon the predicted payment date, the modification changing a timing of future payments due to align with the predicted payment date.

16. The non-transitory machine-readable medium of claim 15, wherein the training data set is labelled with a payment date of the debtor.

17. The non-transitory machine-readable medium of claim 15, wherein the operations further comprise determining a probability for whether a payment will be made on the predicted payment date using the prediction model.

18. The non-transitory machine-readable medium of claim 15, wherein the operations further comprise:
    modifying a data structure of a contact center to change a timing of a contact to a time proximate to the predicted payment date.

19. The non-transitory machine-readable medium of claim 15, wherein the operations further comprise:
    modifying a data structure of a contact center to change a call script used when contacting the debtor based upon the predicted payment date.

20. The non-transitory machine-readable medium of claim 15, wherein the operations of determining the predicted payment date using the past payment history information and the account history of the non-debt account of the debtor as inputs to the prediction model comprises determining a plurality of predicted payment dates for a plurality of debtors in parallel using parallel processing and a plurality of instances of the prediction model.

\* \* \* \* \*